United States Patent [19]

Totten

[11] Patent Number: 4,979,722

[45] Date of Patent: Dec. 25, 1990

[54] BUTTERFLY ACTUATOR

[75] Inventor: Roger W. Totten, Lakewood, Colo.

[73] Assignee: Adolph Coors Company, Golden, Colo.

[21] Appl. No.: 449,534

[22] Filed: Dec. 12, 1989

[51] Int. Cl.[5] .................................................. F16K 1/00

[52] U.S. Cl. ........................................ 251/260; 74/569; 384/147

[58] Field of Search ............... 251/251, 258, 257, 260, 251/261; 74/569; 384/131, 147, 153, 146, 294, 300; 464/197

[56] References Cited

U.S. PATENT DOCUMENTS 3,193,335 7/1965 Wing ................................ 384/300 X 3,415,581 12/1968 Seubert ............................ 384/147 X 3,626,498 12/1971 Rihm .................................. 251/261

4,320,777 3/1982 Tomlin et al. .................. 251/251 X

*Primary Examiner*—John C. Fox

*Attorney, Agent, or Firm*—Klaas & Law

[57] ABSTRACT

A butterfly actuator is provided and has a pair of spaced apart cams which move a valve stem wherein the cams are integral with a shaft having one portion having a generally cylindrical outer surface which is rotatably mounted in a bearing sleeve fixedly mounted in a housing mounted at a fixed location and wherein the bearing sleeve has a length which is between about 2.0 and 3.5 times the diameter of the generally cylindrical outer surface. A butterfly actuator is mounted on an end portion of the shaft so that movement of the butterfly actuator rotates the shaft and is formed from a metallic material to provide for an extended life period of useful operation.

17 Claims, 3 Drawing Sheets

FIG. 6
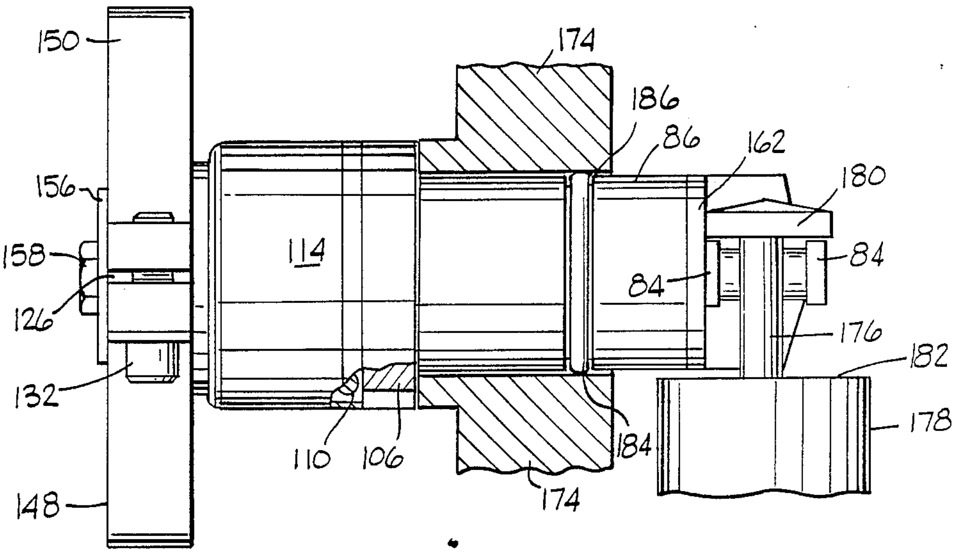
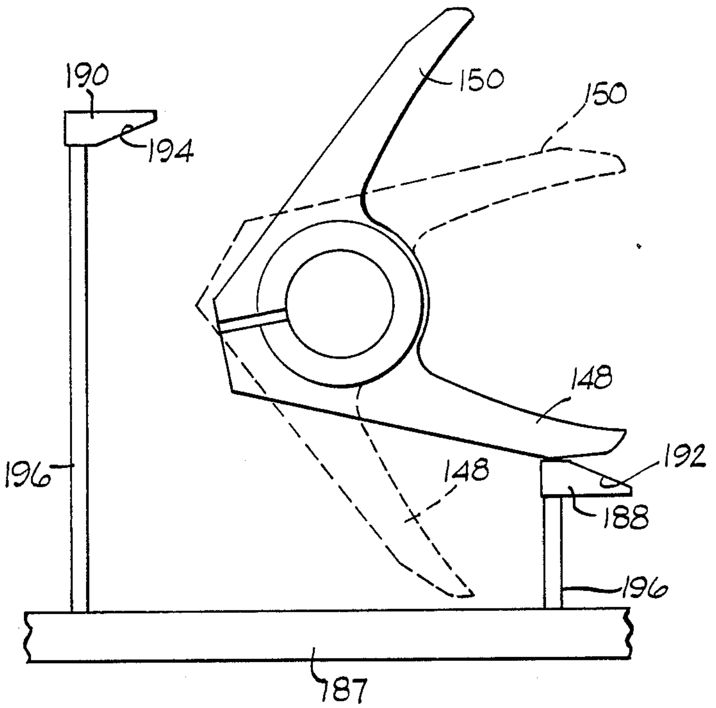
FIG. 7

BUTTERFLY ACTUATOR

FIELD OF THE INVENTION

The invention relates generally to actuating mechanisms which are used to move a member between two positions and more particularly to a butterfly actuator which is a cam actuated lever to open and close a valve port in a beverage can or bottle filling apparatus.

BACKGROUND OF THE INVENTION

Apparatus for filling beverage containers, such as cans or bottles, generally comprises a rotating turret having a plurality of pockets in which empty containers are inserted at one location and filled beverage containers are removed at another location. After an empty container is inserted into the pocket, and as the turret rotates, a first valve is opened and a gas is fed into the empty container. When the container is filled with gas, a second valve is actuated and the beverage is fed into the container. The opening and closing of these valves is conventionally accomplished using a butterfly actuator which is rotatably mounted on the turret so as to be moved between two positions. A plurality of cams are mounted around but spaced from the periphery of the rotating turret. The cams are located in spaced apart rows so as to be contacted by the butterfly actuator so as to move the butterfly actuator from a first position to a second position or vice versa. A modern beverage container filling apparatus fills about 1,500 to 1,700 cans per minute, and such apparatus has between 120 and 165 actuators. The contact between the butterfly portion and the cams causes wear of the butterfly portion and other parts of the apparatus which results in downtime which at such rates of production is very costly.

BRIEF DESCRIPTION OF THE INVENTION

This invention provides a butterfly actuator that operates in an efficient manner to open and close valves in a can or bottle beverage filling apparatus and has an extended period of useful operation.

In a preferred embodiment of the invention, the butterfly actuator comprises an actuator arm having an integral shaft having a generally cylindrical outer surface and an end portion having a generally rectangular cross-sectional configuration. A bearing housing has a longitudinally extending passageway extending therethrough and a bearing sleeve is force fitted therein. The passageway has two spaced apart annular grooves extending radially outwardly and the bearing sleeve is located between the two grooves. A lip type sealing gasket is located in each groove. The bearing housing has an outwardly projecting mounting flange located between the ends thereof, and a spring is positioned around an outer surface portion of the bearing housing. A hollow spring retainer is positioned around the spring. The butterfly portion comprises a central body portion having a longitudinally extending passageway extending therethrough and having a cross-sectional configuration to correspond with the cross-sectional configuration of the end portion of the shaft. A longitudinal slot extends through the central body portion on one side thereof into the passageway and a pair of facing spaced apart lugs project outwardly from the central body portion on each side of the slot. The lugs have aligned openings extending therethrough. A pair of spaced apart butterfly levers project outwardly from the opposite side of the central body portion and have outer surfaces adapted to contact cams on the can or bottle beverage filling apparatus. The butterfly portion is preferably formed from hardened stainless steel. The central body portion has a recess formed in the surface facing the spring retainer and has a generally rectangular cross-sectional configuration. A brake pad having a cross-sectional configuration to mate with that of the recess is located in the recess so that the brake pad faces the spring retainer. The butterfly actuator is assembled by placing the bearing sleeve in the bearing housing and the lip type sealing gaskets in the grooves. A thrust washer is placed over the cylindrical shaft which is then inserted through one side of the bearing housing until it projects out of the other side. The spring and spring retainer are positioned over the outer surface portion of the bearing housing. The brake pad is inserted into the recess in the central body portion and the butterfly portion is pushed over the end portion of the shaft. A washer and a screw threaded into a threaded opening in the end of the shaft are used to place the proper tension on the spring so that the brake pad bears against a facing surface of the spring retainer. A threaded bolt is then passed through the aligned openings in the lugs and is threaded into a threaded hole in one lug and tightened to secure the butterfly portion to the end portion of the shaft. The flange portion is provided with openings for mounting on the can or bottle beverage filling machine.

BRIEF DESCRIPTION OF THE DRAWINGS

An illustrative and presently preferred embodiment of the invention is shown in the accompanying drawings in which:

FIG. 6 is a side elevational view of the butterfly actuator in use; and

FIG. 7 is a schematic illustration of the operation of the butterfly actuator.

DETAILED DESCRIPTION OF THE INVENTION

Figure 1:
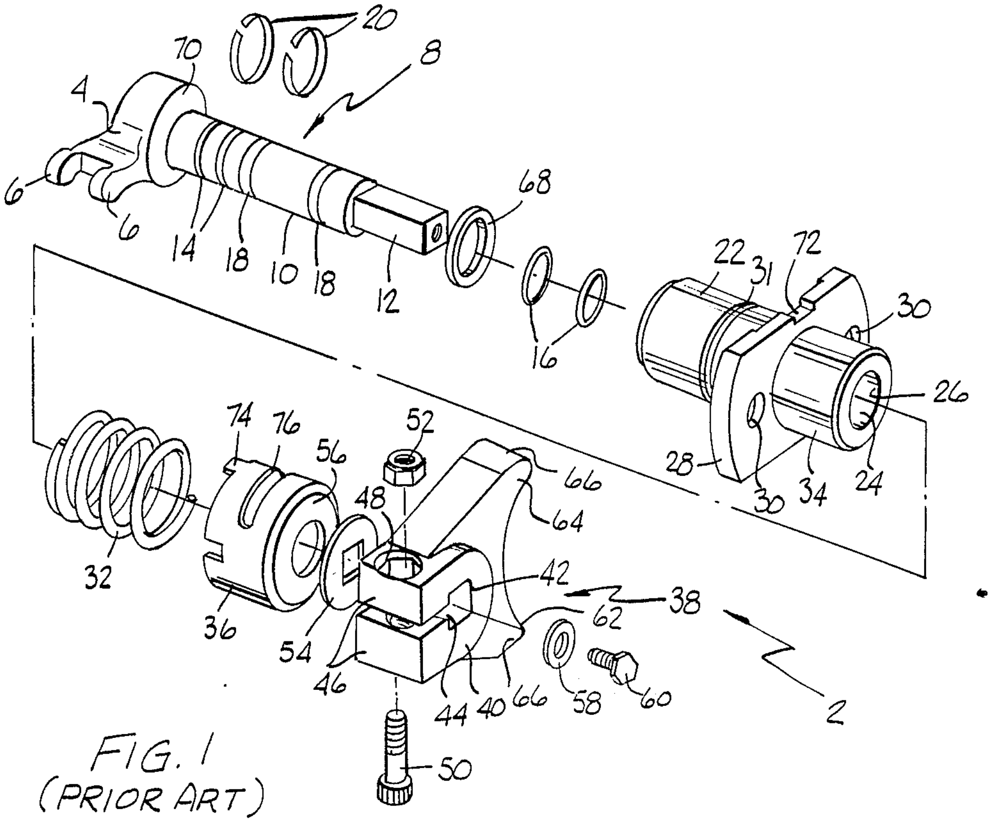
FIG. 1 (PRIOR ART)
FIG. 1 is an exploded perspective view of a butterfly actuator of the prior art.

In FIG. 1, there is illustrated a butterfly actuator 2 of the prior art comprising an actuator arm 4 having a pair of spaced apart cams 6 which function to raise or lower a valve stem (not shown). A shaft 8 is integral with the actuator arm 4 and has a generally cylindrical portion 10 and a generally rectangular portion 12. The generally cylindrical portion 10 has a pair of spaced apart annular grooves 14, each of which is adapted to receive a sealing O-ring gasket 16 and a pair of spaced apart annular grooves 18, each of which is adapted to receive a split bearing 20 formed from a plastic material having a low coefficient of friction. A housing 22 is provided and has a longitudinally extending passageway 24 for receiving the shaft 8 and having a generally cylindrical inner surface 26 in contact with the split bearings 20 for permitting rotational movement of the shaft 8. A flange member 28 projects outwardly from the housing 22 and has openings 30 so that the butterfly actuator 2 may be mounted on the can or bottle beverage filling apparatus. An annular groove 31 is provided on the housing 22 to accommodate a sealing gasket. A spring 32 is placed around an end portion 34 of the housing 22 and is located within a hollow spring retainer 36. The plastic butterfly portion 38 has a central body portion 40 having a generally rectangularly shaped passageway 42 extending therethrough. A slot 44 extends through the central body portion 40 into the passageway 42. A pair of spaced apart lugs 46 extend outwardly from the central body portion 40 and have aligned openings 48 so that a threaded bolt 50 may be passed therethrough and a threaded nut 52 may be threaded thereon and tightened so as to secure the butterfly portion to the shaft 8 for rotation therewith. A non-replaceable brake pad 54 is secured in a recess in the central body portion 40 and contacts the surface 56 to hold the butterfly actuation in the position to which it has been moved. A washer 58 and a threaded bolt 60 are used to control the frictional contact between brake pad 54 and the surface 56. A pair of spaced apart butterfly levers 62 and 64 project outwardly from the central body portion 40 and have outer surfaces 66 adapted to contact cams (not shown) on the can or bottle beverage filling apparatus. A thrust washer 68 is adapted to be located on the shaft 8 between the housing 22 and the surface 70 of the actuator arm 4. A pair of recesses 72 in the flange 28 and a pair of tabs 74 extending from the spring retainer 36 and located in the recesses 72 cooperate to permit relative sliding movement between the housing 22 and the spring retainer 36 but to prevent relative rotational movement therebetween. A slot 76 is provided in the hollow spring retainer for cleaning purposes.

Figure 2:
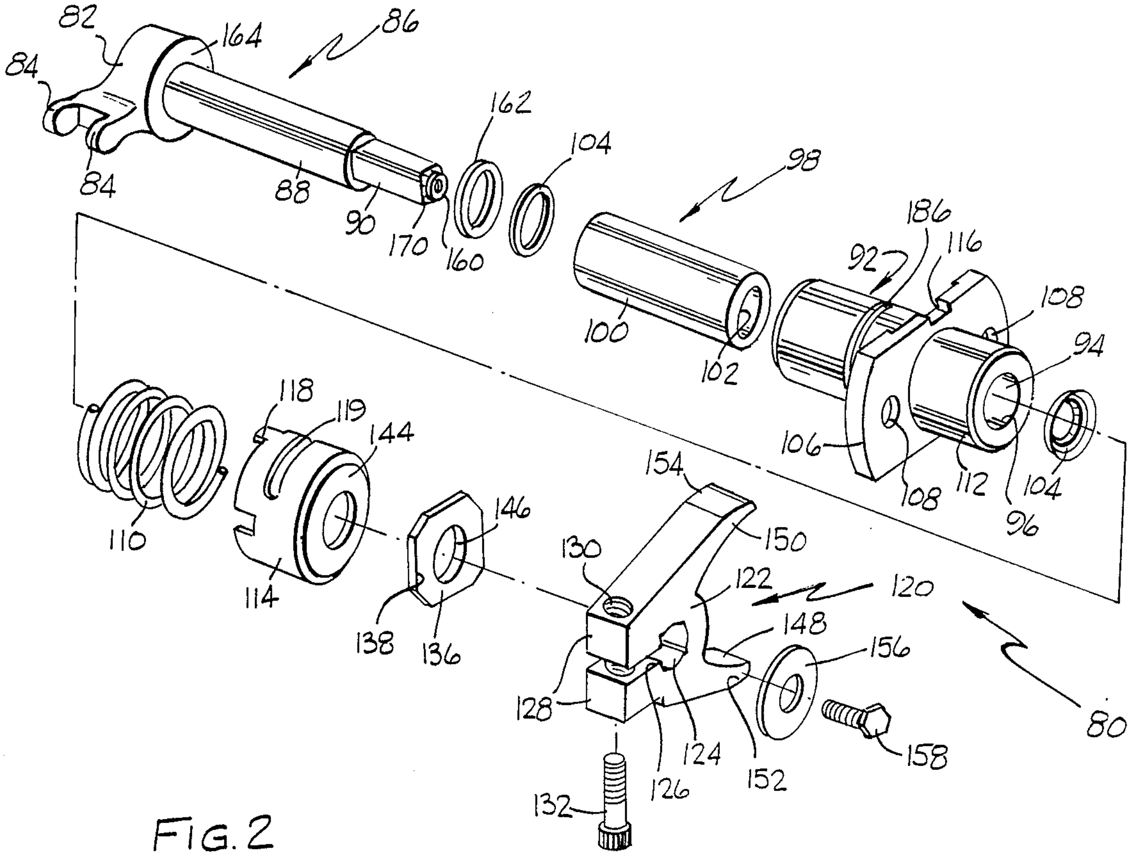
FIG. 2 is an exploded perspective view of a preferred butterfly actuator of this invention.

In FIG. 2, there is illustrated a preferred embodiment of the invention and comprises a butterfly actuator 80 comprising an actuator arm 82 having a pair of spaced apart cams 84 which function to raise or lower a valve stem (described below). A shaft 86 is integral with the actuator arm 82 and has a portion 88 having a generally cylindrical continuous outer surface and an end portion 90 having a generally rectangular cross-sectional configuration having rounded corners 91 having the same radius as the generally cylindrical outer surface of the portion 88. A bearing housing 92 has a longitudinally extending passageway 94 extending therethrough and having a generally cylindrical inner surface 96. A bearing sleeve 98 is provided and has a generally cylindrical outer surface 100 so that the bearing sleeve 98 may be force fitted into the cylindrical inner surface 96. The generally cylindrical inner and outer surfaces 96 and 100 may be of other configurations so long as they mate together. The bearing sleeve 98 has a generally cylindrical continuous inner surface 102 and is adapted to receive at least a portion of the shaft 86 for rotation therein. The bearing sleeve 98 has a length of between about 2.0 to 3.5 times the diameter of the generally cylindrical outer surface of the portion 88 and preferably of about 3.0 times the diameter thereof. The bearing sleeve 98 is made from a plastic material having an extremely low coefficient of friction. A pair of lip type sealing gaskets 104 are provided and are described more fully below. A flange member 106 projects outwardly from the bearing housing 92 and has openings 108 so that the butterfly actuator 80 may be mounted on the can or bottle beverage filling apparatus. A spring 110 is provided and is adapted to be positioned around the end portion 112 of the bearing housing 92 and is located within a hollow spring retainer 114. A pair of recesses 116 are formed in the flange 106 and a pair of tabs 118 extend from the spring retainer 114 and are located in the recesses 116 and cooperate to permit relative sliding movement between the housing 92 and the spring retainer 114 but to prevent relative rotational movement therebetween. A slot 119 is provided in the hollow spring retainer for cleaning purposes.

Figure 4:
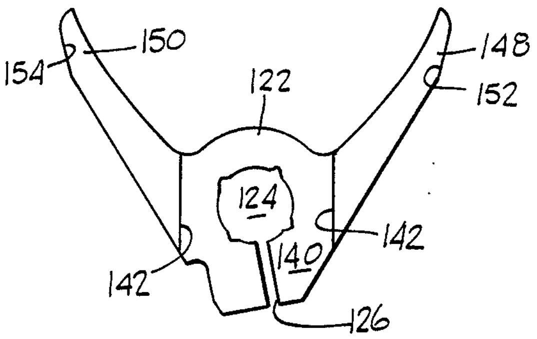
FIG. 4 is a top plan view of the butterfly portion.
Figure 5:
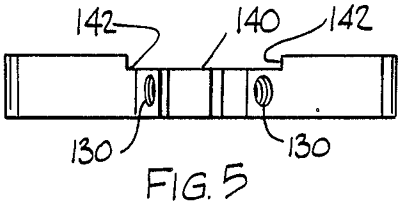
FIG. 5 is a front elevational view of FIG. 4.

The butterfly portion 120, FIGS. 2, 4 and 5, has a central body portion 122 having a passageway 124 having a cross-sectional configuration corresponding to the cross-sectional configuration of the end portion 90 so as to prevent relative rotational movement therebetween. A slot 126 extends through the central body portion 122 into the passageway 124. A pair of spaced apart lugs 128 extend outwardly from the central body portion 122 and have aligned openings 130, one of which is threaded, so that a headed threaded bolt 132 may be passed therethrough and threaded into the threaded opening so that the headed threaded bolt 132 may be tightened so as to move the lugs 128 toward each other to provide a clamping force on the end portion 90 to ensure non-rotational movement between the end portion 90 and the butterfly portion 120. A replaceable brake pad 136 has linearly extending sidewalls 138 and is adapted to be placed in a recess 140, FIGS. 4 and 5, having linearly extending sidewalls 142 so as to prevent rotational movement of the brake pad 136. The brake pad in the assembled condition contacts the annular surface 144 of the hollow spring retainer 114 to hold the butterfly portion 120 in the position to which it has been moved. The brake pad 136 has a central opening 146 so that the shaft 86 may pass therethrough. A pair of spaced apart butterfly levers 148 and 150 project outwardly from the central body portion 122 and have outer surfaces 152 and 154 adapted to contact cams (described below) on the can or bottle beverage filling apparatus to move the butterfly portion 120 from a first position to a second position. The butterfly portion 120 is formed from a hardened stainless steel so as to provide a long life therefor. A washer 156 and a threaded bolt 158 are used to control the frictional contact between the brake pad 136 and the annular surface 144 by threading the threaded bolt 158 into a threaded opening 160 in the end portion 90 and tightening the threaded bolt 158. A thrust washer 162 is adapted to be located on the cylindrical portion 88 between the bearing housing 92 and the surface 164 of the actuator arm 82.

Figure 3:
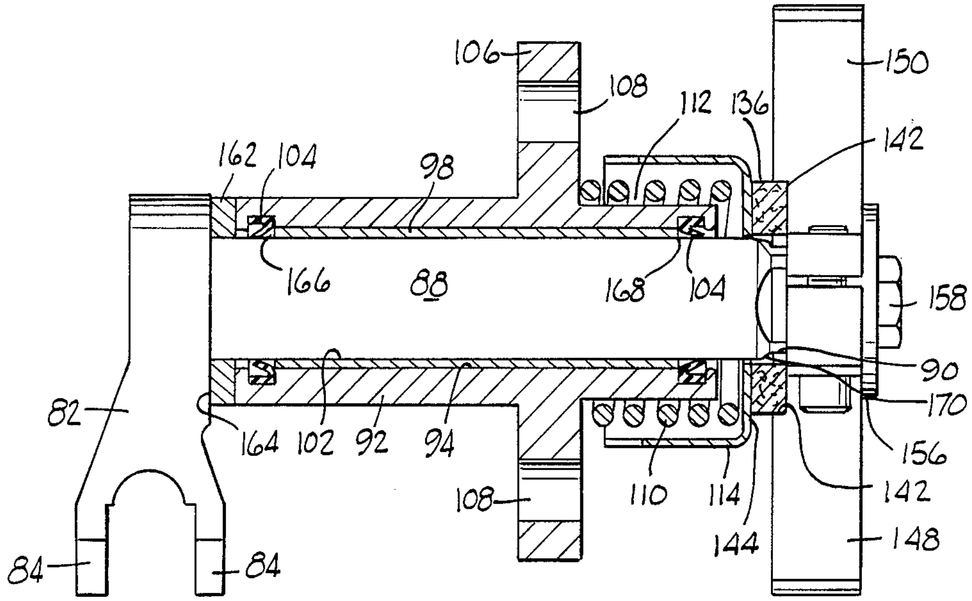
FIG. 3 is a side elevational view with parts in section of the assembled butterfly actuator.

The assembled butterfly actuator 80 is illustrated in FIG. 3. The butterfly actuator 80 is assembled by press fitting the bearing sleeve 98 into the passageway 94 until it is located between the two spaced apart annular grooves 166 and 168 in the passageway 94. A lip type sealing gasket 104 is then positioned in each of the annular grooves 166 and 168. The thrust washer 162 is then placed over the shaft 86 and moved into contact with the surface 164. The shaft 86 is then inserted into the bearing housing 92 and the bearing sleeve 98. The end portion 90 has a cross-sectional configuration which permits it to pass through the lip type sealing gaskets 104 and the inner surface 102. A chamferred section 170 is provided on the end portion 90 so that the lip type sealing gaskets 104 may be gradually moved radially outward so that the generally cylindrical portion 88 may pass therethrough. When in the assembled condition, the lip type sealing gaskets 104 prevent entry of undesirable materials between the inner surface 102 and the generally cylindrical portion 88. As illustrated in FIG. 3, there is a very close fit between the inner surface 102 and the generally cylindrical portion 88 and this cooperates with the length of the bearing sleeve 98 to provide stability to the butterfly actuator 80. The shaft 86 is moved until the end portion 90 projects out of the end portion 112. The spring 110 and the hollow spring retainer 114 are then placed over the end portion 112. The brake pad 136 is placed in the recess 140 and positioned so that the opening 146 is aligned with the passageway 124. The butterfly portion 120 is then placed over the end portion 90 and the washer 156 is placed over the end portion 90 and the threaded bolt 158 is threaded into the opening 160 and tightened. As the threaded bolt 158 is tightened, the spring 110 is compressed so as to urge the annular surface 144 of the hollow spring retainer 114 into contact with the brake pad 136 so as to provide the frictional forces to retain the butterfly actuator 80 in the position to which it has been moved. The threaded bolt 132 is then passed through the aligned openings 130 and threaded into the threaded opening and tightened so as to move the lugs 128 toward each other so as to apply a clamping force to ensure non-rotational movement between the end portion 90 and the butterfly portion 120.

One use for the butterfly actuator 80 is illustrated in FIG. 6. The flange portion 106 is mounted on a sidewall 174 of a rotating turret of a conventional beverage can filling machine. The stem portion 176 of a valve (not shown) projects outwardly from the housing 178 and is located between the spaced apart cams 84. The head portion 180 on the stem portion 176 is acted upon by the spaced apart cams 84 to open the valve and the surface 182 of the housing 178 is acted on by the spaced apart cams 84 to close the valve. A sealing gasket 184 seated in a groove 186 of the bearing housing contacts an opposite surface portion of sidewall 174.

The operation of the butterfly actuator 80 is schematically illustrated in FIG. 7. An annular support member 187 is fixedly mounted so as to surround and be spaced from the sidewall 174. A plurality of cams 188 and 190 having camming surfaces 192 and 194 are fixedly mounted on the annular support member 187 at spaced apart circumferential fixed locations around the rotating turret by support members 196 so as to be contacted by the butterfly levers 148 and 150. The butterfly lever 148 has moved over the camming surface 192 and the butterfly actuator 80 has been moved to a first position, as illustrated by the solid lines of butterfly levers 148 and 150 to move the valve stem 176 and head portion 180 to a first position. As the turret continues to rotate, the butterfly lever 150 contacts the camming surface 194 to move the butterfly actuator 80 to a second position as illustrated by the dashed lines of butterfly levers 148 and 150 to move the valve stem 176 and head portion 180 to a second position.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A butterfly actuator comprising:

a shaft having at least one portion thereof comprising a generally cylindrical outer surface and an end portion;

said shaft having a longitudinal axis;

valve actuating means integral with said shaft and extending radially outwardly therefrom;

a housing having a passageway extending therethrough;

mounting means on said housing for mounting said housing at a fixed location;

a bearing sleeve having a generally cylindrical continuous inner surface fixedly mounted in said passageway of said housing;

said generally cylindrical outer surface of said shaft being mounted in said bearing sleeve to provide for rotational movement of said shaft between first and second positions;

a butterfly actuator having a central body portion having a passageway extending therethrough;

a pair of spaced apart actuating levers integral with said central body portion and extending radially outwardly therefrom;

mounting means for mounting said central body portion on said end portion of said shaft to prevent relative rotational movement therebetween;

retaining means for retaining said shaft in said first or said second position;

a pair of spaced apart grooves in said passageway of said housing;

sealing means located in each of said grooves and in sealing engagement with next adjacent portions of each of said grooves and said generally cylindrical outer surface to prevent entry of undesirable materials between said generally cylindrical inner surface of said bearing sleeve and said generally cylindrical outer surface of said shaft; and said bearing sleeve having opposite end portions located next adjacent to said grooves.

2. A butterfly actuator as in claim 1 wherein:

said end portion of said shaft having a generally rectangular cross-sectional configuration; and said passageway extending through said central body portion having a cross-sectional configuration corresponding with said generally rectangular cross-sectional configuration so that portions thereof are in contact with portions of said end portion of said shaft to prevent relative rotational movement therebetween.

3. A butterfly actuator as in claim 2 and further comprising:

a longitudinally extending slot extending through said central body portion into said passageway thereof;

a pair of spaced apart integral lugs project radially outwardly from either side of said slot; and force applying means for moving said lugs toward each other to apply forces on said central body portion to ensure contact between said end portion of said shaft and said passageway of said central body portion.

4. A butterfly actuator as in claim 3 wherein:

said bearing sleeve has a length of between about 2.0 to 3.5 times the diameter of said generally cylindrical outer surface.

5. A butterfly actuator as in claim 4 wherein said retaining means comprises:

a brake pad mounted at a fixed location on said central body portion;

a hollow spring retainer;

an annular end surface on said hollow spring retainer having an opening therein for permitting passage of said end portion of said shaft therethrough;

said mounting means comprising at least one flange portion extending radially outwardly from said housing;

spring means extending between said at least one flange portion and said annular end surface for urging said annular end surface into contact with said brake pad; and mounting means for mounting said hollow spring retainer on said housing to provide for relative sliding movement therebetween but to prevent relative rotational movement therebetween.

6. A butterfly actuator as in claim 5 wherein:

said butterfly actuator having an end surface facing said annular end surface;

a recess having at least one linearly extending surface formed in said end surface; and said replaceable brake pad having a configuration to mate with said recess and having at least one linearly extending surface to contact said at least one linearly extending surface of said recess to prevent relative rotational movement therebetween.

7. A butterfly actuator as in claim 1 wherein:

said butterfly actuator comprises a metallic material.

8. A butterfly actuator as in claim 7 wherein:

said metallic material is hardened stainless steel.

9. A butterfly actuator as in claim 8 wherein:

said end portion of said shaft having a generally rectangular cross-sectional configuration; and said passageway extending through said central body portion having a cross-sectional configuration corresponding with said generally rectangular cross-sectional configuration so that portions thereof are in contact with portions of said end portion of said shaft to prevent relative rotational movement therebetween.

10. A butterfly actuator as in claim 9 and further comprising:

a longitudinally extending slot extending through said central body portion into said passageway thereof;

a pair of spaced apart integral lugs projecting radially outwardly from either side of said slot; and force applying means for moving said lugs toward each other to apply forces on said central body portion to ensure contact between said end portion of said shaft and said passageway of said central body portion.

11. A butterfly actuator as in claim 1 wherein:

said bearing sleeve has a length of between about 2.0 and 3.5 times the diameter of said generally cylindrical outer surface.

12. A butterfly actuator as in claim 11 wherein:

said bearing sleeve has a length of about 3 times the diameter of said generally cylindrical outer surface.

13. A butterfly actuator as in claim 11 wherein:

said end portion of said shaft having a generally rectangular cross-sectional configuration; and said passageway extending through said central body portion having a cross-sectional configuration corresponding with said generally rectangular cross-sectional configuration so that portions thereof are in contact with portions of said end portion of said shaft to prevent relative rotational movement therebetween.

14. A butterfly actuator as in claim 13 and further comprising:

a longitudinally extending slot extending through said central body portion into said passageway thereof;

a pair of spaced apart integral lugs projecting radially outwardly from either side of said slot; and force applying means for moving said lugs toward each other to apply forces on said central body portion to ensure contact between said end portion of said shaft and said passageway of said central body portion.

15. A butterfly actuator as in claim 14 wherein:

said bearing sleeve comprises a plastic material having an extremely low coefficient of friction.

16. A butterfly actuator as in claim 15 wherein:

said butterfly actuator comprises a hardened stainless steel.

17. A butterfly actuator as in claim 1 wherein said sealing means comprise:

a lip type sealing gasket in each of said grooves; and an opening in each of said lip type sealing gaskets facing away from said bearing sleeve.

* * * * *